(12) United States Patent
Miles

(10) Patent No.: US 11,679,829 B1
(45) Date of Patent: Jun. 20, 2023

(54) ADJUSTING STRUCTURE FOR SEAT POST OF BICYCLE

(71) Applicant: TIEN HSIN INDUSTRIES CO., LTD., Taichung (TW)

(72) Inventor: Jason Miles, Taichung (TW)

(73) Assignee: Tien Hsin Industries Co., Ltd., Taichung (TW)

( * ) Notice: Subject to any disclaimer, the term of this patent is extended or adjusted under 35 U.S.C. 154(b) by 0 days.

(21) Appl. No.: 17/696,194

(22) Filed: Mar. 16, 2022

(30) Foreign Application Priority Data

Jan. 14, 2022 (TW) .................................. 111101708

(51) Int. Cl.
*B62J 1/06* (2006.01)
(52) U.S. Cl.
CPC ...................................... *B62J 1/06* (2013.01)
(58) Field of Classification Search
CPC .......... B62J 1/08; B62J 2001/085; B62J 1/06; B62K 2201/08
See application file for complete search history.

(56) References Cited

U.S. PATENT DOCUMENTS

| 2019/0308681 A1* | 10/2019 | Staples | ....................... B62J 1/08 |
| 2019/0367114 A1* | 12/2019 | Winefordner | .............. B62J 1/08 |
| 2022/0111919 A1* | 4/2022 | Staples | ....................... B62J 1/08 |

FOREIGN PATENT DOCUMENTS

| CN | 108423101 A | 8/2018 |
| TW | M502614 U | 6/2015 |
| TW | M575784 U | 3/2019 |
| TW | M612659 U | 6/2021 |

OTHER PUBLICATIONS

Search Report for TW111101708, dated Nov. 29, 2022, Total of 1 page.
Translation of Abstract of TWM612659, Total of 1 page.
Translation of Abstract of TWM502614, Total of 1 page.
Translation of Abstract of TWM575784, Total of 1 page.
Translation of Abstract of CN 108423101, Total of 1 page.

\* cited by examiner

*Primary Examiner* — Sarah B McPartlin
(74) *Attorney, Agent, or Firm* — Apex Juris, PLLC; Tracy Heims; R Wylie

(57) ABSTRACT

An adjusting structure for seat post of bicycle includes an external tube. A gas lift is disposed in and engaged with the external tube. An actuator rod protrudes away from a main body of the gas lift. An internal tube is movably disposed in the external tube, and the actuator rod is engaged with an end of the internal tube. A diameter of the internal tube is greater than a diameter of the main body, so that the internal tube could be moved relative to the main body in an axial direction. A restricting structure is mounted between the main body and the internal tube and is adapted to restrict the internal tube from rotating relative to the gas lift and the external tube. Since the restricting structure is not in contact with the external tube, friction provided by the restricting structure could not deform the external tube.

11 Claims, 9 Drawing Sheets

US 11,679,829 B1

ADJUSTING STRUCTURE FOR SEAT POST OF BICYCLE

BACKGROUND OF THE INVENTION

Technical Field

The present disclosure relates generally to a component of a bicycle, and more particularly to an adjustable structure for a seat post of the bicycle.

Description of Related Art

So far, a saddle of a bicycle is fixed to the bicycle by inserting a seat post into a seat tube of the bicycle frame. When the height of the saddle needs to be adjusted, the saddle and the seat post need to be pushed down or pulled up by a user to a proper height. After that, the quick-release connector is utilized to clamp the seat post. However, the conventional adjustment means is laborious. Therefore, there is another seat tube adjusting structure is provided to the market, wherein the seat tube adjusting structure includes an external tube disposed in the seat tube, and a gas lift in the external tube supports the seat post. With such design, the gas lift would keep pushing the seat post to move upward, so that when the user is sat on the saddle, the height of the seat post can be easily adjusted by a weight of the user and the upward force provided by the gas lift. After the height of the seat post is adjusted properly, fix the seat post at the proper height.

In the conventional seat tube adjusting structure, the external tube forms slot inside, and a circumference of the seat post forms the restricting member that could correspondingly be engaged with the slot to prevent the seat tube from rotating relative to the external tube. In order to form the restricting structure, a thickness of the external tube has to be increased for forming a recess, so that a weight of the external tube is increased. Besides, when the seat post is slid relative to the external tube, a friction provided by the restricting structure could deform the external tube to hinder the movement of the seat post relative to the external tube.

BRIEF SUMMARY OF THE INVENTION

In view of the above, the primary objective of the present disclosure is to provide an adjusting structure for a seat post, wherein an internal tube of the seat tube is unable to rotate relative to the external tube, and the external tube of the seat tube does not need to be disposed with a restricting structure. Thus, a thickness of the external tube could be thinner to reduce a weight of the adjusting structure for the seat post without reducing the strength thereof.

The present disclosure provides an adjusting structure for a seat post of a bicycle, including an external tube, a gas lift, and an internal tube. The external tube has a closed end. The gas lift is disposed in the external tube and includes a main body and an actuator rod, wherein the actuator rod protrudes from the main body, and the main body is fixed in the external tube. The internal tube is movably disposed in the external tube, wherein the internal tube is movable along an axial direction of the internal tube. An end of the internal tube has an engaging portion that is adapted to be engaged with the actuator rod of the gas lift. An inner diameter of the internal tube is greater than an outer diameter of the main body of the gas lift, so that the main body of the gas lift is movable in the axial direction relative to the internal tube. A restricting structure is located between the main body of the gas lift and an inner wall of the internal tube and fits around the main body of the gas lift, wherein the restricting structure is adapted to restrict the internal tube from rotating relative to the gas lift and the external tube.

Since the restricting structure is disposed between the internal tube and the main body of the gas lift and is not in contact with the external tube. Therefore, the manufacturing process of the external tube could be simplified, and the thickness and the weight of the external tube could be reduced. The external tube with a thinner wall could still firmly clamp the internal tube after the external tube is exerted by a force. Since the external tube is not exerted by a friction force provided by the restricting structure, so that the external tube could not be deformed to hinder the internal tube to be raised or lowered in the external tube.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
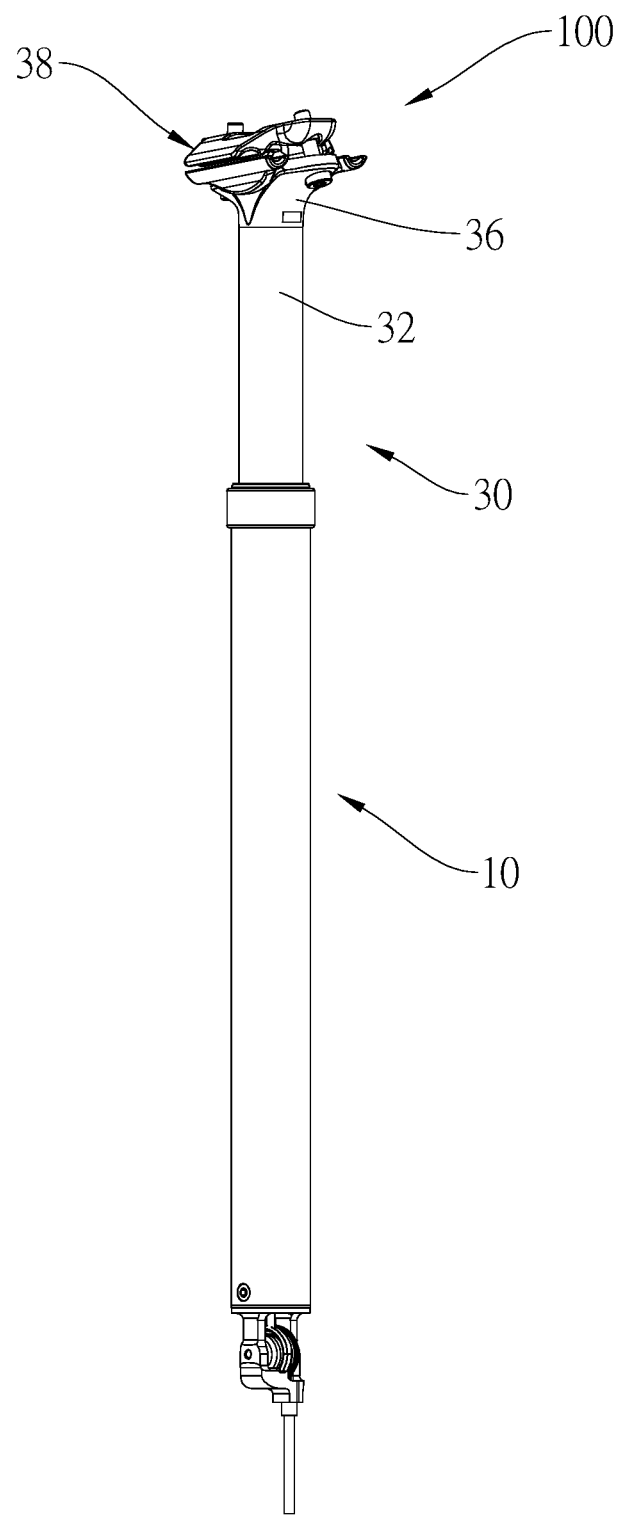
FIG. 1 is a perspective view of the adjusting structure for the seat post of the bicycle of an embodiment according to the present disclosure.

As illustrated in FIG. 1 to FIG. 8, an adjusting structure 100 for a seat post of a bicycle of an embodiment according to the present disclosure includes an external tube 10, a gas lift 20, an internal tube 32, and a restricting structure 40, wherein the restricting structure 40 is mounted between the gas lift 20 and the internal tube 32. When the adjusting structure 100 is mounted to the bicycle, the external tube 10 of the adjusting structure 100 is disposed in a seat tube of the bicycle.

The external tube 10 is a straight tube, wherein a bottom end of the external tube 10 is a closed end.

The gas lift 20 is disposed in the external tube 10 and includes a main body 22 and an actuator rod 24. An end of the main body 22 is engaged with the closed end of the external tube 10, so that the main body 22 is fixed in the external tube 10. The actuator rod 24 protrudes from another end of the main body 22.

The internal tube 32 is movably disposed in the external tube 10, wherein the internal tube 32 is movable along an axial direction of the internal tube 32. In order to make a circumference of the external tube 10 could be easily deformed by an external force to clamp and fix a circumference of the internal tube 32, a thickness of a wall of the external tube 10 is smaller than a thickness of a wall of the internal tube 32. A top end of the internal tube 32 has an engaging portion 321 that is adapted to be engaged with the actuator rod 24 of the gas lift 20. As a depth of the internal tube 32 that is inserted into the external tube 10 is changed, a length of the actuator rod 24 that protrudes out from the main body 22 of the gas lift 20 is changed correspondingly. An inner diameter of the internal tube 32 is greater than an outer diameter of the main body 22 of the gas lift 20, and a section of the internal tube 32 is overlapped with a section of the main body 22 of the gas lift 20, so that as the depth of the internal tube 32 that is inserted into the external tube 10 is changed, the main body 22 of the gas lift 20 is moved in the axial direction relative to the internal tube 32.

The restricting structure 40 fits around the main body 22 and is adapted to restrict the internal tube 32 from rotating relative to the gas lift 20 and the external tube 10.

Figure 7:
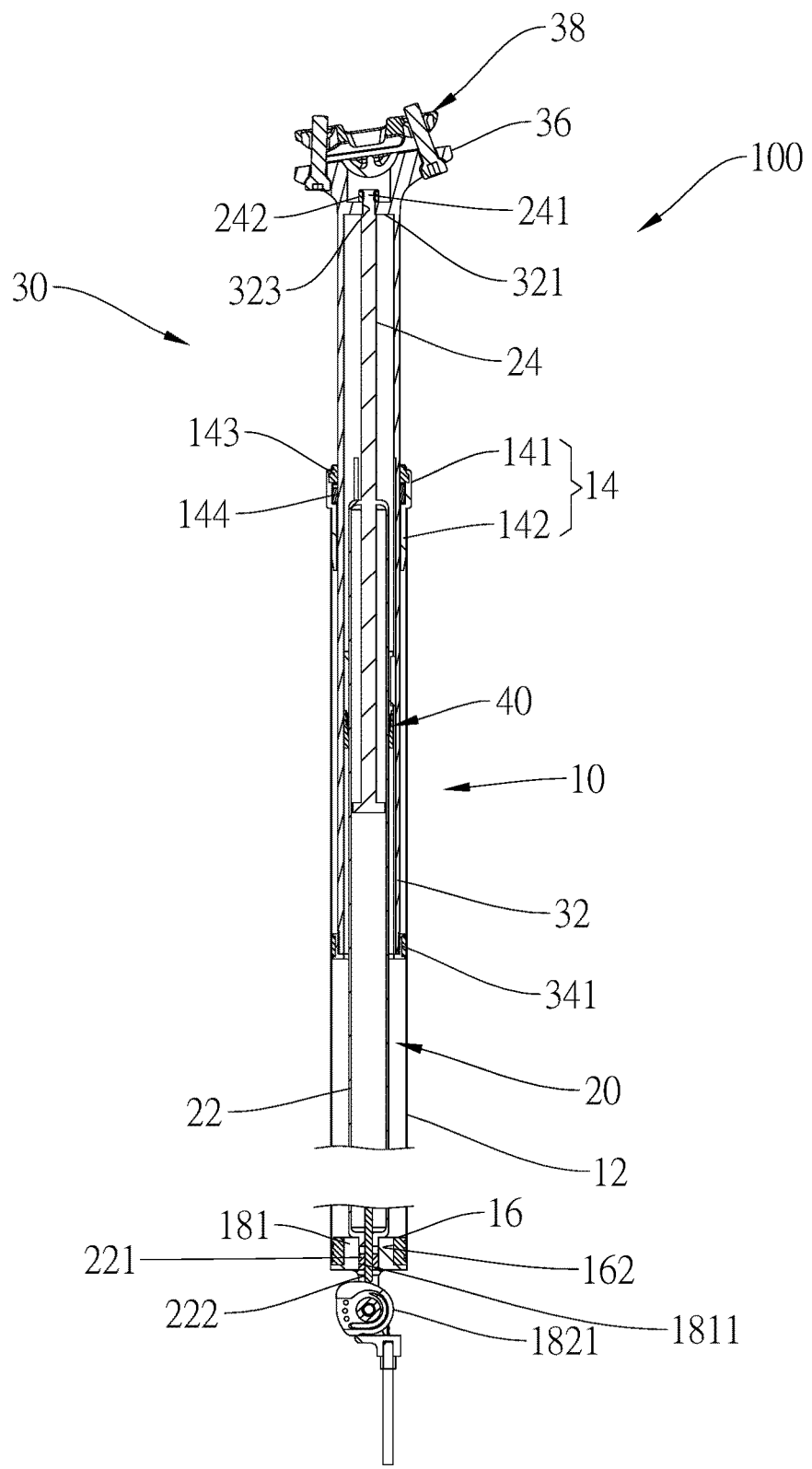
FIG. 7 is a sectional view taken along the 7-7 line in FIG. 6.
Figure 8:
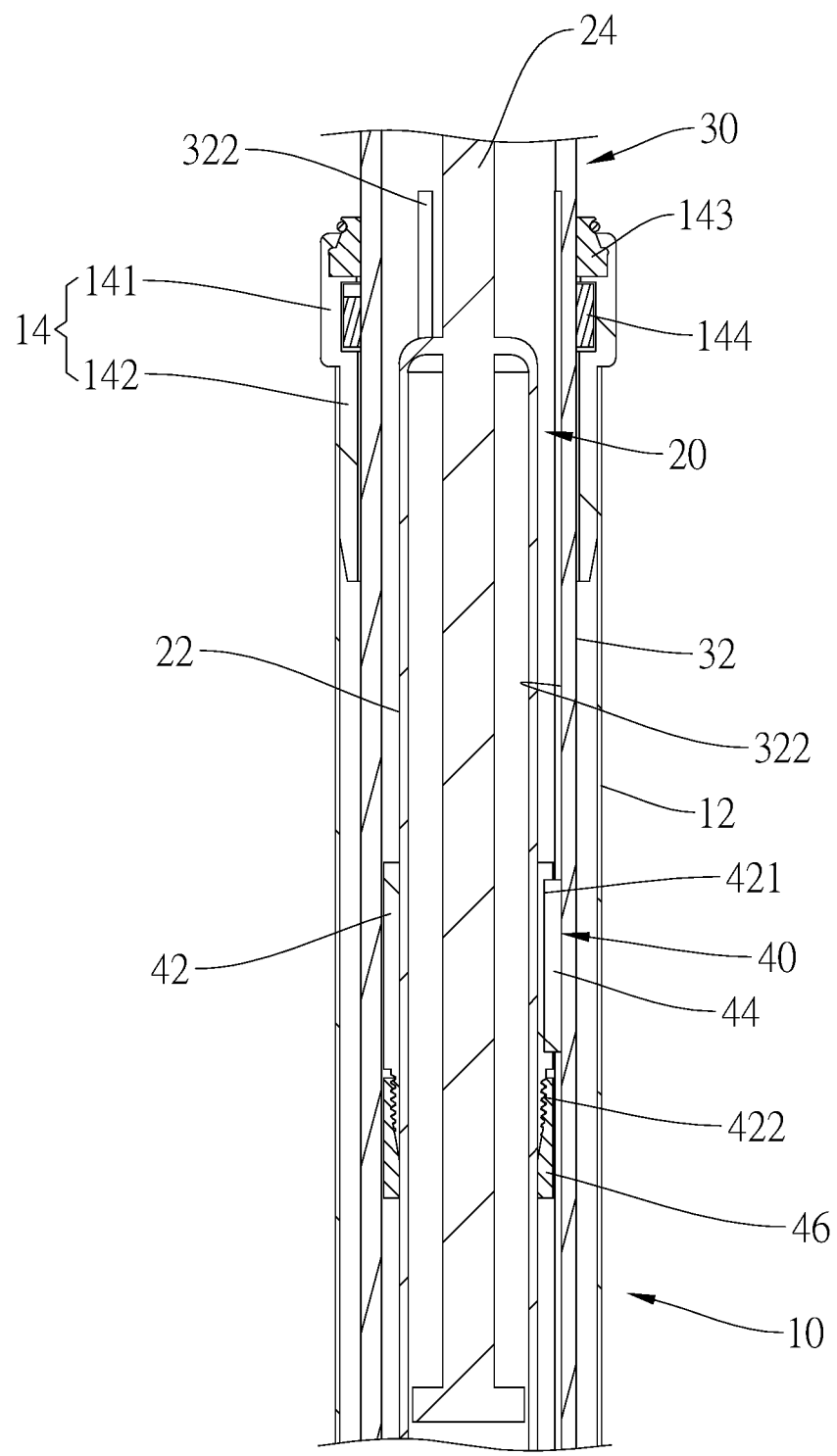
FIG. 8 is an enlarged partial view of a portion in FIG. 7.
Figure 9:
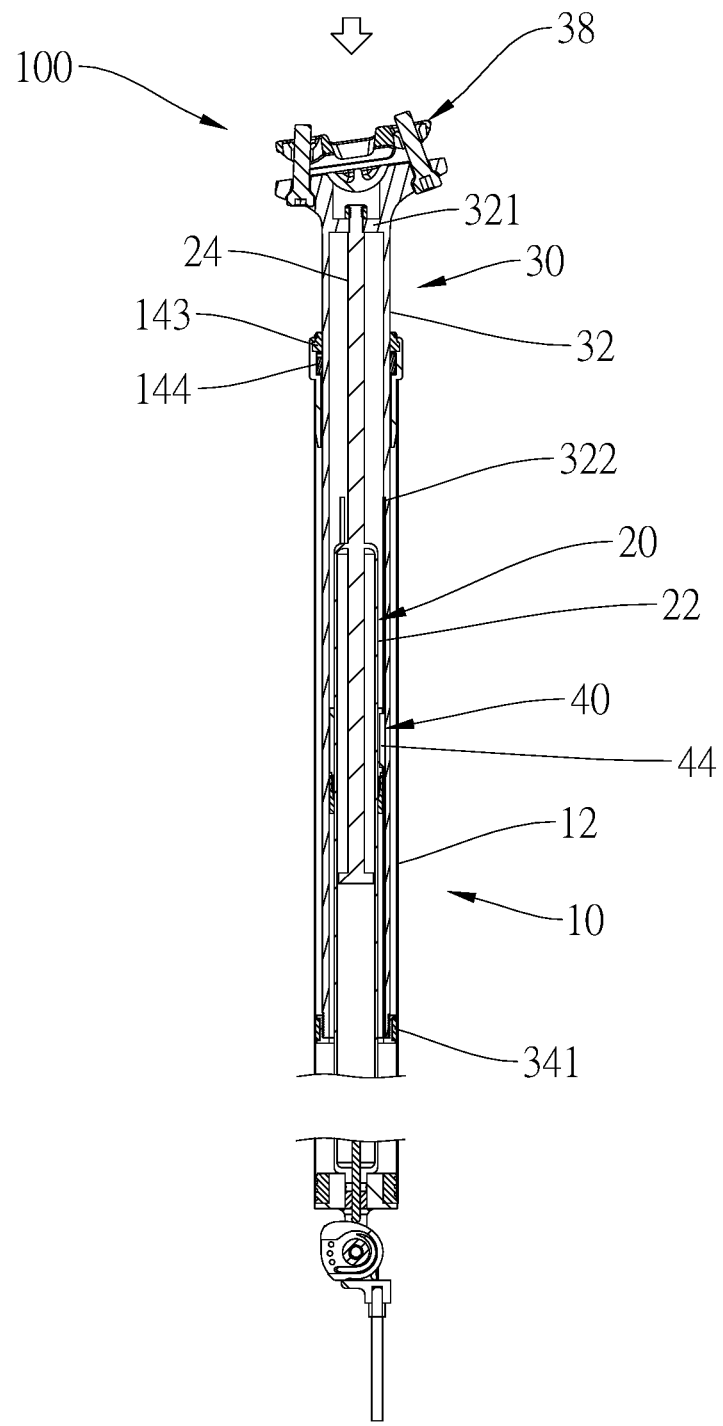
FIG. 9 is a schematic view of the adjusting structure for the seat post of the bicycle of the embodiment according to the present disclosure, showing the seat post is moved down.

The internal tube 32 is a tube portion of the seat post 30. When the adjusting structure 100 is used, a saddle (not shown) of the bicycle is engaged with a top end of the seat post 30. As illustrated in FIG. 7 to FIG. 9, since the gas lift 20 could be shortened as the gas lift 20 is exerted by a force, the gas lift 20 could support the internal tube 32 when the internal tube 32 is compressed to insert into the external tube 10. On the contrary, the gas lift 20 could be extended as the force exerted to the gas lift 20 is released, so that the gas lift 20 could push a portion of the internal tube 32 to protrude away from the external tube 10. With such design, a user could arbitrarily adjust the depth of the internal tube 32 that is inserted into the external tube 10. When the depth is properly adjusted, a quick-release connector or other clamping devices on the seat tube is utilized to clamp the external tube 10, thereby deforming the external tube 10 to clamp and lock the internal tube 32 to fix the height of the saddle. During a process of adjusting the height of the saddle, the internal tube 32 is restricted by the restricting structure 40 from rotating, so that a front end of the saddle remains facing forward.

In the current embodiment, since the restricting structure 40 is disposed between the main body 22 and the internal tube 32, other restricting structure does not need to be disposed between the external tube 10 and the internal tube 32. With such design, a manufacturing method of the external tube 10 could be simplified, and the thickness of the wall of the external tube 10 could be reduced. Thus, a weight of the external tube 10 is lightened without reducing the strength of the external tube 10, so that a weight of the adjusting structure 100 is lightened, and the external tube 10 is deformed by compression could still fixedly clamp the internal tube 32. Additionally, when the internal tube 32 is either lifted or dropped, the damping position is located between the gas lift 20 and the internal tube 32. Therefore, the external tube 10 does not be deformed by a friction provided by the restricting structure 40 to hinder the lift and drop of the internal tube 32.

Figure 2:
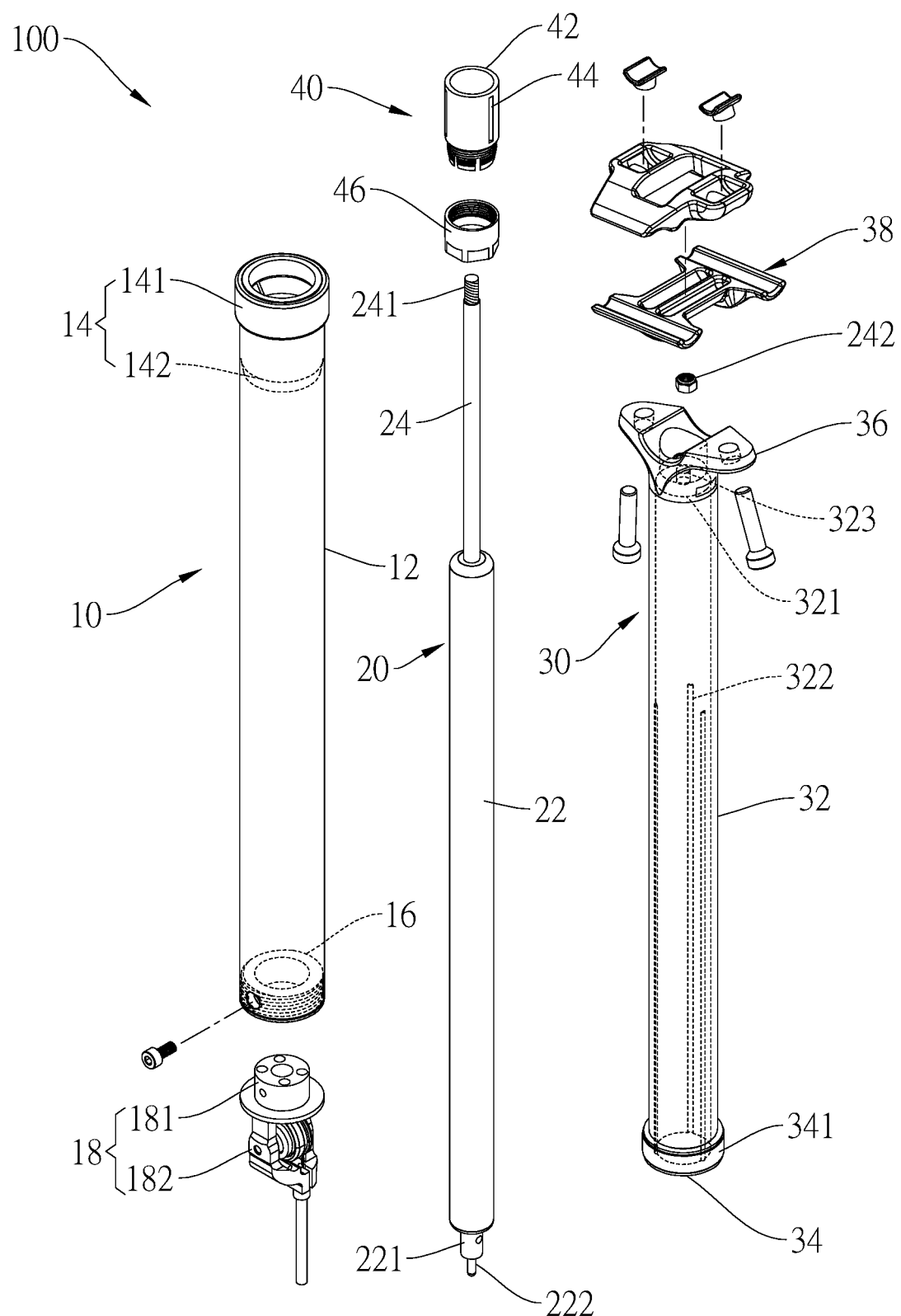
FIG. 2 is an exploded view of the adjusting structure of the embodiment according to the present disclosure.

The following describes the current embodiment in detail. As illustrated in FIG. 2, FIG. 7, and FIG. 8, the external tube 10 has a tube body 12, and a top end of the external tube 10 is disposed with an upper bearing bracket 14. The upper bearing bracket 14 has an annular protruding portion 141 and a bearing portion 142. An outer diameter of the annular protruding portion 141 is greater than an outer diameter of the bearing portion 142. The annular protruding portion 141 is positioned at a top edge of the external tube 10, so that the bearing portion 142 could be inserted into the annular protruding portion 41 from a top end of the external tube 10. A dust collar 143 is embedded in the annular protruding portion 141 and surrounds along an inner wall of the annular protruding portion 141. The upper bearing 144 is embedded in the bearing portion 142 and surrounds along an inner wall of the bearing portion 142. The internal tube 32 passes through the upper bearing bracket 14, wherein an external wall of the internal tube 32 is slidably in contact with the dust collar 143 and the upper bearing 144. The dust collar 143 could prevent the dust from entering the external tube 10. A bottom end of the internal tube 32 is disposed with a bottom bearing bracket 34. A bottom bearing 341 is embedded in an outer wall of the bottom bearing bracket 34. The bottom bearing 341 is slidably in contact with an inner wall of the external tube 10. In the current embodiment, the upper bearing 144 and the bottom bearing 341 are self-lubricating bearings. In other embodiments, the upper bearing 144 and the bottom bearing 341 could be linear bearings or bushings.

Figure 3:
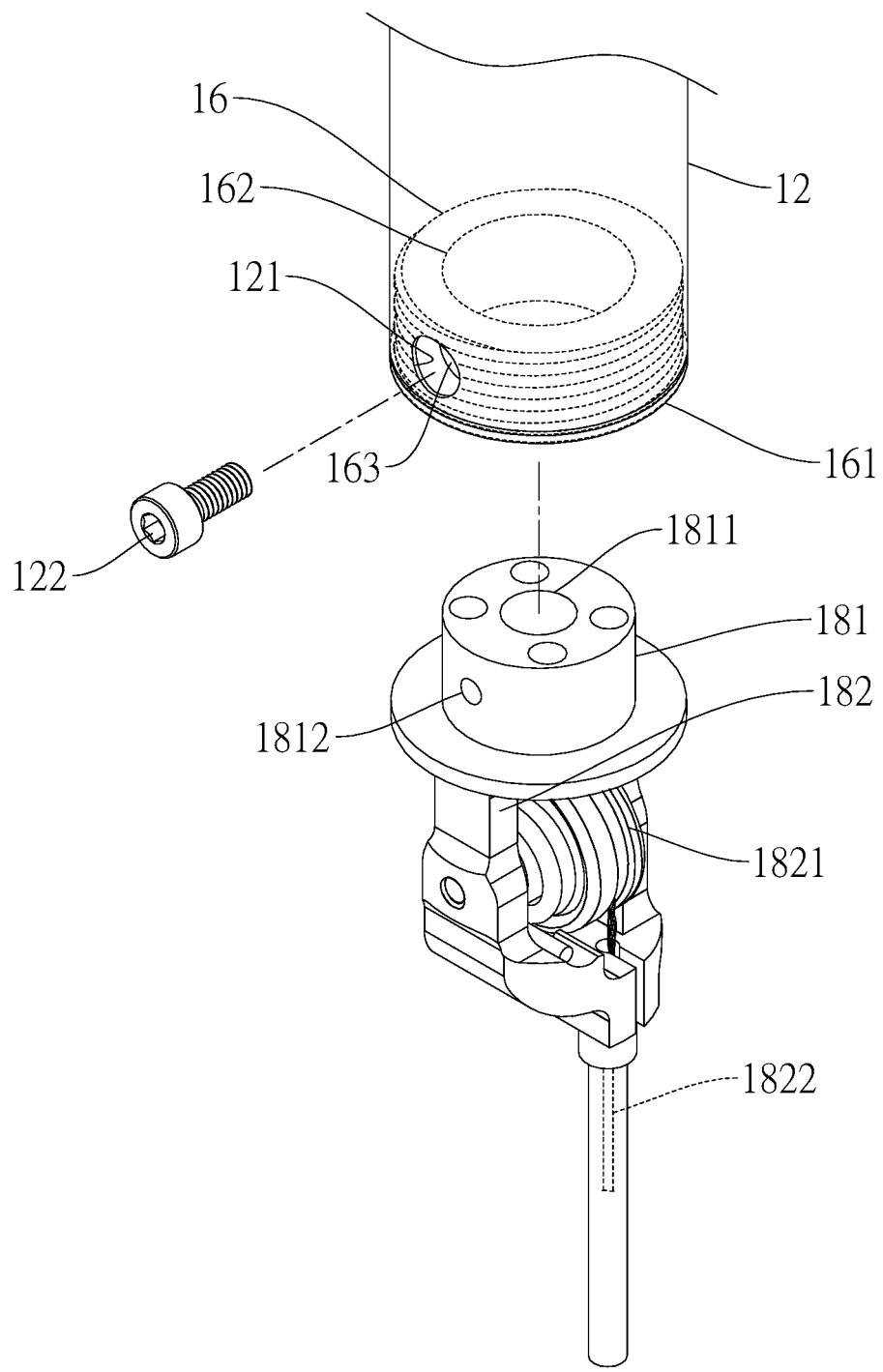
FIG. 3 is an enlarged partial view of the end plug shown in FIG. 2.

As illustrated in FIG. 3 and FIG. 7, a circumference of a bottom portion of the external tube 10 has an outer perforation 121. The bottom end of the external tube 10 is disposed with an end plug 16, wherein a circumference of a bottom portion of the end plug 16 has a flange 161. The flange 161 abuts against a bottom edge of the external tube 10. A middle of the end plug 16 has a receiving hole 162, and a circumference of the end plug 16 has a counterbore 163. Two ends of the counterbore 163 are connected and communicate with the receiving hole 162 and the outer perforation 121, respectively.

The receiving hole 162 is disposed with a cam assembly 18, wherein the cam assembly 18 includes a base 181 and a cam bracket 182. The base 181 passes through the receiving hole 162. The base 181 has a fixing hole 1811 at middle and a threaded hole 1812 on a circumference of the base 181. Two ends of the threaded hole 1812 are connected to and communicate with the fixing hole 1811 and the counterbore 163, respectively. The cam bracket 182 is connected to a bottom side of the base 181, and a cam 1821 is pivotally connected between two side members of the cam bracket 182. The cam 1821 is located below the fixing hole 1811 and is connected to a cable 1822.

A fixing tube 221 is disposed at a bottom end of the main body 22 of the gas lift 20 and protrudes away from the main body 22 in the axial direction of the internal tube 32. The fixing tube 221 is inserted into the fixing hole 1811. A screw 122 passes through the outer perforation 121 and the counterbore 163 to screw with the threaded hole 1812. An end of the screw 122 opposite to a head of the screw 122 urges against the fixing tube 221 of the main body 22. The gas lift 20 is fixed to the bottom end of the external tube 10. The fixing tube 221 has a button 222 for releasing gas that passes through the fixing tube 221 and protrudes away from the fixing tube 221. A bottom end of the button 222 for releasing gas abuts against the cam 1821.

As illustrated in FIG. 2 and FIG. 7, a middle portion of the engaging portion 321 has a top perforation 323. A top end of the actuator rod 24 forms a protruding portion 241 that corresponds to the top perforation 323, wherein a diameter of the protruding portion 241 is smaller than a diameter of a section of the actuator rod 24 other than the protruding portion 241. The protruding portion 241 passes through the top perforation 323, wherein an end of the protruding portion 241 that protrudes away from the top perforation 323 is engaged with a fixing nut 242, so that the top end of the actuator rod 24 is engaged with the engaging portion 321. The top end of the internal tube 32 is connected to a saddle seat 36, the saddle seat 36 is passed through by screws to engage a saddle fixing assembly 38 that is adapted to fix the saddle of the bicycle.

Figure 4:
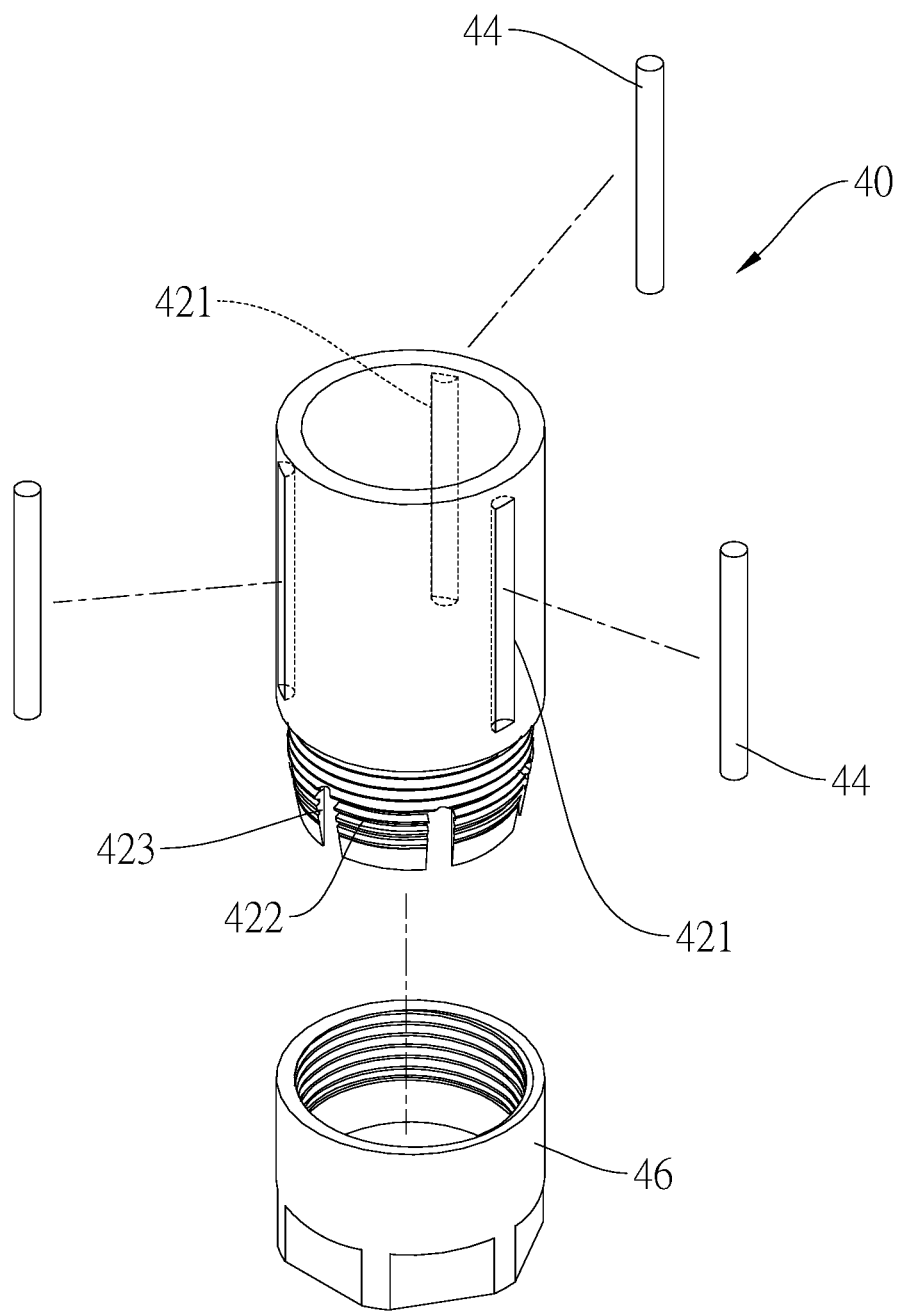
FIG. 4 is an exploded view of the sleeve, the restricting member, and the positioning nut of then embodiment according to the present disclosure.
Figure 5:
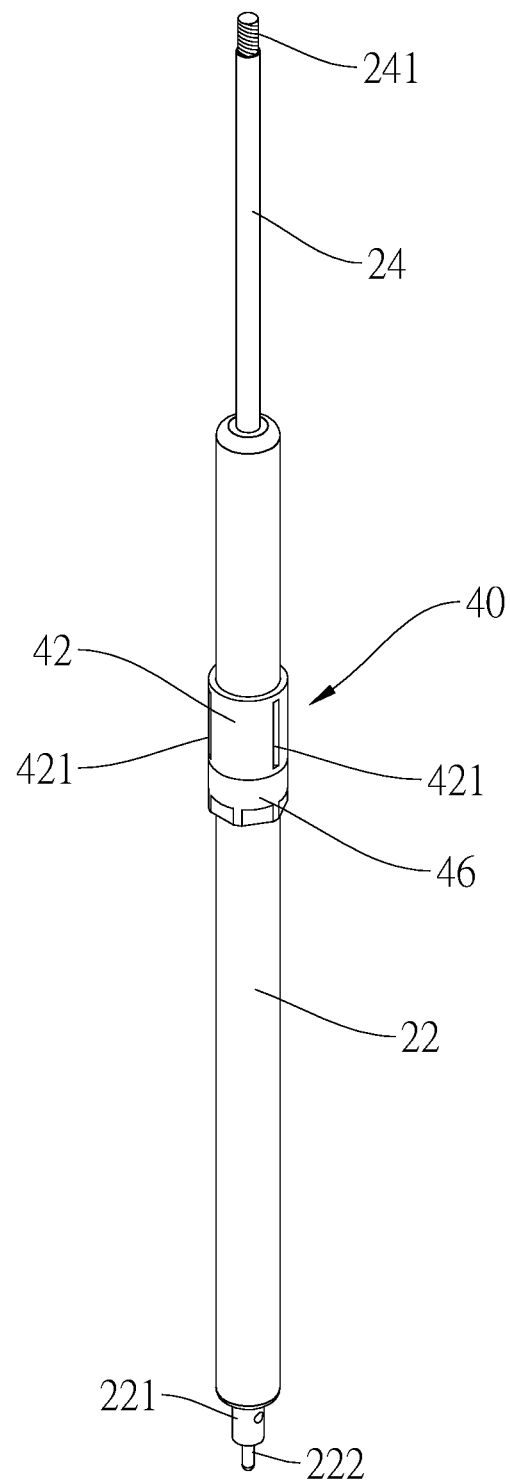
FIG. 5 is a perspective view of the gas lift that is disposed with the restricting member of the embodiment according to the present disclosure.
Figure 6:
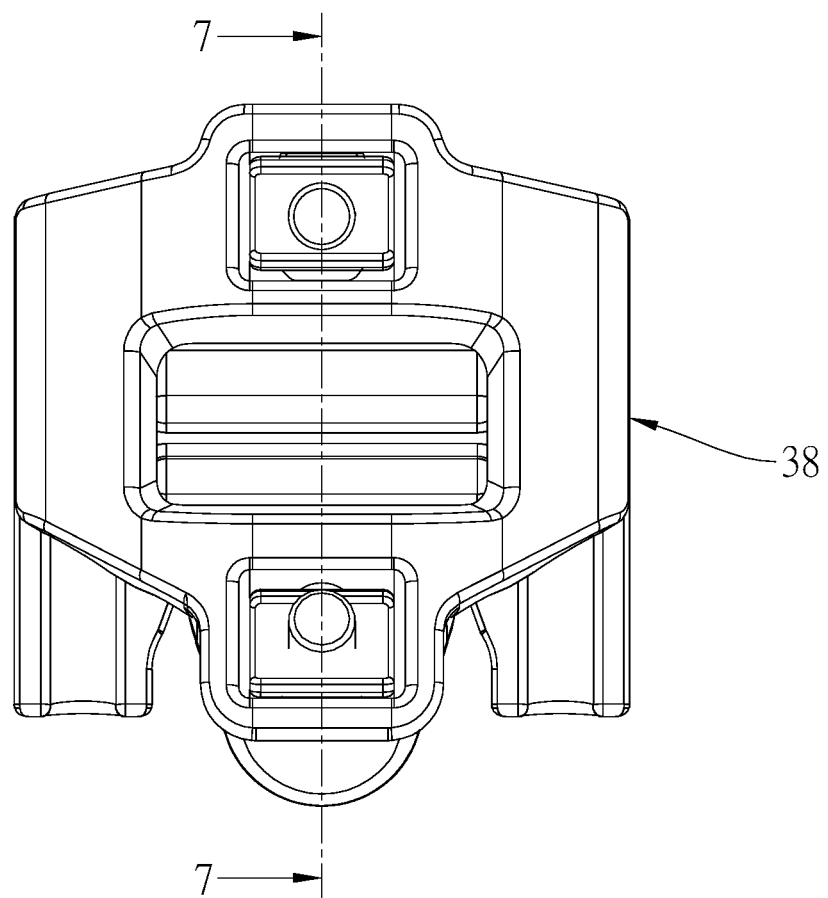
FIG. 6 is a top view of the adjusting structure for the seat post of the bicycle of the embodiment according to the present disclosure.

As illustrated in FIG. 2, FIG. 4, and FIG. 7, the restricting structure 40 has a sleeve 42. At least one restricting member 44 is attached to an outer surface of the sleeve 42. In the current embodiment, a means of connection between the at least one restricting member 44 and the sleeve 42 is described below. The outer surface of the sleeve 42 has at least one groove 421, wherein the at least one restricting member 44 is engaged with the at least one groove 421. A number of the at least one restricting member 44 corresponds to a number of the at least one groove 421. When the at least one groove 421 includes a plurality of grooves 421, the grooves 421 are evenly spaced and arranged around the outer surface of the sleeve 42, as shown in FIG. 4. In the current embodiment, the sleeves 42 includes three grooves 421 that are evenly spaced and arranged around the outer surface of the sleeve 42, wherein each of the grooves 421 extends along the axial direction of the internal tube 32. The at least one restricting member 44 includes three restricting members 44, correspondingly, wherein each of the restricting members 44 is a long rod that extends along the axial direction of the internal tube 32. Each of the restricting members 44 is fixed to one of the grooves 421 by embedding a part of each of the restricting members 44 into one of the grooves 421. A recess 322 is formed on an inner wall of the internal tube 32 and corresponds to each of the restricting members 44. Each of the recesses 322 is a long recess that extends along the axial direction of the internal tube 32. Another part of each of the restricting members 44 is slidably received in one of the recesses 322.

The sleeve 42 could be an elastic ring body that fits around a circumference of the main body 22. Alternatively, in the current embodiment, a bottom end of the sleeve 42 has a threaded portion 422 extending along the axial direction of the internal tube 32. The threaded portion 422 has at least one slot 423. In the current embodiment, the at least one slot 423 includes a plurality of slots 423, wherein the slots 423 divides the threaded portion 422 into a plurality of sections, as shown in FIG. 4. When the threaded portion 422 is screwed with the positioning nut 46, the positioning nut 46 compresses the threaded portion 422 to close up the sections of the threaded portion 422, so that the threaded portion 422 clamps an outer surface of the main body 22 of the gas lift 20, thereby the sleeve 42 is fixed on the circumference of the main body 22.

It must be pointed out that the embodiment described above is only a preferred embodiment of the present disclosure. All equivalent structures which employ the concepts disclosed in this specification and the appended claims should fall within the scope of the present disclosure.

What is claimed is:

1. An adjusting structure for seat post of bicycle, comprising:
    an external tube having a closed end;
        a gas lift disposed in the external tube and comprising a main body and an actuator rod, wherein the actuator rod protrudes from the main body, and the main body is fixed in
        the external tube;
        an internal tube movably disposed in the external tube, wherein the internal tube is movable along an axial direction of the internal tube; an end of the internal tube has an engaging portion that is adapted to be engaged with the actuator rod of the gas lift; an inner diameter of the internal tube is greater than an outer diameter of the main body of the gas lift, so that the main body of the gas lift is movable in the axial direction relative to the internal tube; and
        a restricting structure fitting around the main body of the gas lift and located between the main body and an inner wall of the internal tube, wherein the restricting structure is adapted to restrict the internal tube from rotating relative to the gas lift and the external tube.

2. The adjusting structure as claimed in claim 1, wherein the restricting structure is a sleeve; at least one restricting member is attached to an outer surface of the sleeve, and the inner wall of the internal tube forms at least one recess for receiving the at least one restricting member; the at least one recess extends along the axial direction of the internal tube; a part of the at least one restricting member is slidably received in the at least one recess.

3. The adjusting structure as claimed in claim 2, wherein an end of the sleeve has a threaded portion extending along the axial direction of the internal tube; the threaded portion has at least one slot that divides the threaded portion into a plurality of sections; when the threaded portion is screwed with a positioning nut, the positioning nut compresses the threaded portion to close up the sections of the threaded portion, so that the threaded portion clamps an outer surface of the main body of the gas lift to fix the sleeve to the main body.

4. The adjusting structure as claimed in claim 2, wherein the outer surface of the sleeve has at least one groove; the at least one groove extends along the axial direction of the internal tube; the at least one groove is correspondingly disposed with the at least one restricting member; the at least one restricting member is a rod that extends along the axial direction of the internal tube; a part of the at least one restricting member is embedded into the at least one groove to fix the at least one restricting member to the at least one groove, and another part of the at least one restricting member is slidably received in one of the at least one recess.

5. The adjusting structure as claimed in claim 1, wherein a top end of the external tube is disposed with an upper bearing bracket; an upper bearing is disposed in the upper bearing bracket; an internal tube passes through the upper bearing bracket, and an external wall of the internal tube is slidably in contact with the upper bearing; a bottom end of the internal tube is disposed with a bottom bearing bracket; a bottom bearing is disposed on an outer wall of the bottom bearing bracket; the bottom bearing is slidably in contact with an inner wall of the external tube.

6. The adjusting structure as claimed in claim 5, wherein the upper bearing and the bottom bearing are self-lubricating bearings; the upper bearing bracket has an annular protruding portion and a bearing portion; an outer diameter of the annular protruding portion is greater than an outer diameter of the bearing portion; the bearing portion is inserted into the external tube; the upper bearing is embedded in an inner wall of the bearing portion and surrounds along an inner wall of the bearing portion; the annular protruding portion is positioned at a top edge of the external tube; a dust collar is embedded in the annular protruding portion and surrounds along an inner wall of the annular protruding portion; the external wall of the internal tube is slidably in contact with the dust collar for preventing dust from entering into the external tube.

7. The adjusting structure as claimed in claim 5, wherein a bottom end of the external tube is disposed with an end plug, wherein a circumference of a bottom portion of the end plug has a flange; the flange abuts against a bottom edge of the external tube; the end plug has a receiving hole; the receiving hole is disposed with a cam assembly, wherein the cam assembly comprises a base and a cam bracket that is connected to the base; the base passes through the receiving hole; the base has a fixing hole, and the cam bracket is pivotally connected to a cam; the cam is located below the fixing hole and is connected to a cable; a fixing tube is disposed at a bottom end of the main body of the gas lift and protrudes away from the main body in the axial direction of the internal tube; the fixing tube is inserted into the fixing hole to fix the gas lift to the bottom end of the external tube; the fixing tube has a button for releasing gas, wherein the button passes through the fixing tube and protrudes away from the fixing tube; a bottom end of the button for releasing gas abuts against the cam.

8. The adjusting structure as claimed in claim 7, wherein a circumference of a bottom portion of the external tube has an outer perforation; a circumference of the end plug has a counterbore; two ends of the counterbore are connected and communicate with the receiving hole and the outer perforation, respectively; a circumference of the base has a threaded hole, wherein two ends of the threaded hole are connected to and communicate with the fixing hole and the counterbore, respectively; a screw passes through the outer perforation and the counterbore to screw with the threaded hole; an end of the screw urges against the fixing tube of the main body; the gas lift is fixed to the bottom end of the external tube.

9. The adjusting structure as claimed in claim 8, wherein the engaging portion has a top perforation; a top end of the actuator rod forms a protruding portion; a diameter of the protruding portion is smaller than a diameter of a section of the actuator rod other than the protruding portion; the protruding portion passes through the top perforation, wherein an end of the protruding portion that protrudes away from the top perforation is engaged with a fixing nut, so that the top end of the actuator rod is engaged with the engaging portion.

10. The adjusting structure as claimed in claim 9, wherein a top end of the internal tube is connected to a saddle seat; a screw passes through the saddle seat to engage with a saddle fixing assembly for fixing a saddle of the bicycle.

11. The adjusting structure as claimed in claim 4, wherein when the at least one of the restricting member comprises a plurality of restricting members, the outer surface of the sleeve has a plurality of grooves that are evenly spaced and arranged around the outer surface of the sleeve; each of the plurality of grooves is engaged with one of the plurality of restricting members.

* * * * *